US012767537B2

(12) United States Patent
Hwang

(10) Patent No.: US 12,767,537 B2
(45) Date of Patent: Oct. 20, 2026

(54) METHOD FOR CONTINUOUSLY SYNTHESIZING CARBON NANOTUBES

(71) Applicant: KORBON CO., LTD., Gangneung-si (KR)

(72) Inventor: Hee Chung Hwang, Gangneung-si (KR)

(73) Assignee: KORBON CO., LTD., Gangneung-si (KR)

( * ) Notice: Subject to any disclaimer, the term of this patent is extended or adjusted under 35 U.S.C. 154(b) by 707 days.

(21) Appl. No.: 18/251,638

(22) PCT Filed: Oct. 14, 2021

(86) PCT No.: PCT/KR2021/014229
§ 371 (c)(1),
(2) Date: May 3, 2023

(87) PCT Pub. No.: WO2022/097949
PCT Pub. Date: May 12, 2022

(65) Prior Publication Data

US 2024/0018002 A1 Jan. 18, 2024

(30) Foreign Application Priority Data

Nov. 9, 2020 (KR) ........................ 10-2020-0148693
Nov. 9, 2020 (KR) ........................ 10-2020-0148694
Nov. 9, 2020 (KR) ........................ 10-2020-0148695

(51) Int. Cl.

| | |
|---|---|
| ***C01B 32/162*** | (2017.01) |
| ***B01J 37/04*** | (2006.01) |
| ***B01J 37/08*** | (2006.01) |
| ***B01J 37/18*** | (2006.01) |
| ***B01J 37/34*** | (2006.01) |
| ***C01B 32/164*** | (2017.01) |
| ***C01B 32/174*** | (2017.01) |

(52) U.S. Cl.
CPC ............. *C01B 32/162* (2017.08); *B01J 37/04* (2013.01); *B01J 37/08* (2013.01); *B01J 37/18* (2013.01); *B01J 37/349* (2013.01); *C01B 32/164* (2017.08); *C01B 32/174* (2017.08); *C01B 2202/32* (2013.01); *C01B 2202/36* (2013.01)

(58) Field of Classification Search
CPC ... C01B 32/162; C01B 32/164; C01B 32/174; C01B 2202/32; C01B 2202/36; B01J 37/08; B01J 37/18; B01J 37/349; B01J 19/08; B01J 19/10; C01P 2006/12; C01P 2006/40
See application file for complete search history.

(56) References Cited

U.S. PATENT DOCUMENTS 6,325,909 B1 12/2001 Li et al.
8,728,917 B2 * 5/2014 Matsumoto ............ B82Y 30/00 438/479
2003/0161782 A1 * 8/2003 Kim ....................... B82Y 40/00 423/447.3
2007/0224104 A1 9/2007 Kim
2007/0248528 A1 10/2007 Kim

FOREIGN PATENT DOCUMENTS

| | | | |
|---|---|---|---|
| CN | 1535246 | A | 10/2004 |
| JP | H06-157016 | A | 6/1994 |
| JP | 2004-534715 | A | 11/2004 |
| JP | 2007-528339 | A | 10/2007 |
| JP | 2008-512343 | A | 4/2008 |
| JP | 2010-163331 | A | 7/2010 |
| JP | 2012-129201 | A | 7/2012 |
| JP | 2013-027843 | A | 2/2013 |
| KR | 10-2003-0008763 | A | 1/2003 |
| KR | 10-2003-0081567 | A | 10/2003 |
| KR | 10-0432056 | B1 | 5/2004 |
| KR | 10-2005-0080341 | A | 8/2005 |

(Continued)

OTHER PUBLICATIONS

Dai, Hongjie, "Carbon Nanotubes: Synthesis, Integration, and Properties", Accounts of Chemical Research, Issue 12, vol. 35, 2002 (Year: 2002).*
The extended European search report issued by the European Patent Office on Feb. 10, 2025, which corresponds to European Patent Application No. 21889414.5-1014 and is related to U.S. Appl. No. 18/251,638.
An Office Action mailed by China National Intellectual Property Administration on Mar. 15, 2024, which corresponds to Chinese Patent Application No. 202180075291.9 and is related to U.S. Appl. No. 18/251,638.
An Office Action; "Notice of Reasons for Refusal," mailed by the Japanese Patent Office on May 21, 2024, which corresponds to Japanese Patent Application No. 2023-551943 and is related to U.S. Appl. No. 18/251,638.
International Search Report issued in PCT/KR2021/014229; mailed Jan. 25, 2022.

*Primary Examiner* — Anthony J Zimmer
*Assistant Examiner* — Jaanzeb C Raja
(74) *Attorney, Agent, or Firm* — Studebaker Brackett PLLC

(57) ABSTRACT

The present disclosure relates to a method for continuously synthesizing carbon nanotubes using a plasma treated catalyst. The method for continuously synthesizing carbon nanotubes comprises: a plasma treating step of preparing metal nanoparticles by plasma treating metal salts in an $H_2$ or $NH_3$ atmosphere; a first mixture preparing step of preparing an emulsion mixture by mixing a solvent and a surfactant; a second mixture preparing step of preparing a second mixture by mixing the emulsion mixture and a carrier gas; and a reacting step of forming carbon nanotubes by introducing the second mixture and metal nanoparticles into a heated reactor. Accordingly, the catalyst can be prepared by reducing metal salts at a relatively low temperature and in a shorter time, the yield of the carbon nanotubes can be increased, and the diameter of the carbon nanotubes can be uniformly controlled, thereby enabling an economical and mass production of carbon nanotubes.

4 Claims, No Drawings

(56) References Cited

FOREIGN PATENT DOCUMENTS

| | | | | | |
|---|---|---|---|---|---|
| KR | 10-2006-0094958 | A | | 8/2006 | |
| KR | 20070010715 | A | * | 1/2007 | .............. H01M 4/92 |
| KR | 10-0708540 | B1 | | 4/2007 | |
| KR | 10-1508101 | B1 | | 4/2015 | |
| KR | 10-2053726 | B1 | | 12/2019 | |
| KR | 10-2020-0012562 | A | | 2/2020 | |
| KR | 10-2020-0084572 | A | | 7/2020 | |
| KR | 10-2220563 | B1 | | 2/2021 | |
| KR | 10-2230243 | B1 | | 3/2021 | |
| KR | 10-2230246 | B1 | | 3/2021 | |
| WO | 2015/082936 | A1 | | 6/2015 | |
| WO | WO-2020141649 | A1 | * | 7/2020 | ........... C01B 32/164 |

* cited by examiner

METHOD FOR CONTINUOUSLY SYNTHESIZING CARBON NANOTUBES

CROSS-REFERENCE TO RELATED APPLICATIONS

This application is a U.S. National Phase Entry of International Application No. PCT/KR2021/014229 filed on Oct. 14, 2021, which claims the benefit of priority to Korean Patent Application Nos. 10-2020-0148694, 10-2020-0148695, and 10-2020-0148693 filed on Nov. 9, 2020, the entire content of which is incorporated herein by reference.

TECHNICAL FIELD

The present disclosure relates to a continuous carbon nanotube manufacturing method using a gas phase synthesis method. More particularly, the present disclosure relates to a continuous carbon nanotube manufacturing method of continuously manufacturing carbon nanotubes by preparing uniformly sized catalytic metal nanoparticles and reacting them with a carbon source in a gas phase.

In addition, there is provided a method of manufacturing a branched carbon nanotube having improved hydrophilicity and specific surface area by manufacturing a branched carbon nanotube using a catalyst having a pretreated carbon nanotube as a support.

BACKGROUND ART

Thermoplastics, especially high-performance plastics with excellent mechanical properties and heat resistance, are used in a variety of applications. Depending on the field of application, these high-performance plastics require anti-static properties such as antistatic, dust prevention, etc., to prevent malfunctions and contamination of parts, so electrical conductivity is required in addition to the existing properties.

Surfactants, metal powders, metal fibers, etc., have been added to high-performance plastics to give them this electrical conductivity in the past, but these components have problems such as low conductivity and weakened mechanical strength, so there is a growing interest in carbon materials with electrical conductivity.

As a carbon material with electrical conductivity, conductive carbon black is commonly used, but in order to achieve high electrical conductivity using conductive carbon black, a large amount of carbon black needs to be added, and the structure of the carbon black may decompose during the melt mixing process. As a result, the processability of the resin may deteriorate, and the thermal stability and physical properties may be significantly reduced, so research on carbon nanotube-resin composites with carbon nanotubes added instead of conductive carbon black to improve electrical conductivity while reducing the amount of conductive filler is actively being conducted.

Carbon nanotubes, discovered in Japan in 1991, are a material in which three neighboring carbon atoms are bonded to one carbon atom, and the bonds between these carbon atoms form a hexagonal ring, which curls into a cylindrical tube with a honeycomb-like repeating plane.

Carbon nanotubes are divided into a single-walled carbon nanotube (SW carbon nanotube) composed of a single layer and a diameter of about 1 nm, a double-walled carbon nanotube (DW carbon nanotube) composed of two or more layers, and a multi-walled carbon nanotube (MW carbon nanotube) composed of three or more layers and have a diameter of about 5 to 100 nm.

These carbon nanotubes can be synthesized by a variety of methods, including arc discharge, laser evaporation, thermal chemical vapor deposition (CVD), catalytic synthesis, and plasma synthesis, which synthesize carbon nanotubes at high temperatures ranging from hundreds to thousands of degrees, or under vacuum.

However, the existing method has the problem that it is difficult to form a catalyst with a uniform size, and therefore it is difficult to control the diameter of the carbon nanotubes produced uniformly, and a separate reducing agent is required, which is disadvantageous in terms of the economics of the process.

In addition, the more durable the catalyst used and the more uniform the size of the particles with catalytic activity, the more uniform the size and the better the performance of the carbon nanotubes, and the higher the synthesis yield of the carbon nanotubes, so the development of such functional catalysts has been steadily progressing.

Furthermore, conventional synthesis methods can only synthesize one-dimensional carbon nanotubes in the form of tubes or rods. Currently, there are a variety of applications for carbon nanotubes, each requiring specialized carbon nanotubes.

For example, when carbon nanotubes are used as electrode materials, polymer reinforcements, transistors, or electrochemical materials, it may be more advantageous to have branched carbon nanotubes with two- or three-dimensional structures rather than straight, one-dimensional structures in the form of tubes or wires.

In particular, when used as a material for an electrode, two- or three-dimensional branched carbon nanotubes with a tree-like structure at the junction of carbon nanotube to carbon nanotube or carbon nanotube to current collector are expected to be highly efficient and stable in terms of electrode efficiency.

In general, in the case of carbon nanotubes, it is difficult to dissolve or disperse when using carbon nanotubes due to strong van der Waals forces between the carbon nanotubes, and in the case of branched carbon nanotubes, dispersion is even more difficult because the carbon nanotubes entangle and aggregate in the branched area. Accordingly, there is a need for a method of manufacturing carbon nanotubes capable of improving dispersibility during use by increasing the hydrophilicity of branched carbon nanotubes.

DISCLOSURE

Technical Problem

An embodiment of the present disclosure relates to a method for continuously synthesizing carbon nanotubes using a plasma-treated catalyst, in which metal nanoparticles are prepared by plasma treatment of a metal salt, and carbon nanotubes are continuously prepared by reacting with a carbon source in the gas phase, without adding a reducing agent.

A method of manufacturing carbon nanotubes, according to another embodiment of the present disclosure, can produce carbon nanotubes of uniform size and performance by controlling the particle size of the catalyst metal supported on the supported catalyst used to synthesize the carbon nanotubes and can improve the reactivity of the catalyst.

Another embodiment of the present disclosure provides a method of manufacturing branched carbon nanotubes having improved hydrophilicity and specific surface area by manufacturing branched carbon nanotubes using a catalyst having a pretreated carbon nanotube as a support.

Technical Solution

One embodiment of the present disclosure for achieving the above-mentioned objectives includes: a plasma treating step of preparing metal nanoparticles by plasma treating metal salts in an $H_2$ or $NH_3$ atmosphere; a first mixture preparing step of preparing an emulsion mixture by mixing a solvent and a surfactant; a second mixture preparing step of preparing a second mixture by mixing the emulsion mixture and a carrier gas; and a reacting step of forming carbon nanotubes by introducing the second mixture and metal nanoparticles into a heated reactor.

In the plasma treating step, the plasma treating may be performed in a gas atmosphere further including nitrogen gas and Group 18 inert gas in an $H_2$ or $NH_3$ atmosphere. At this time, $H_2$ or $NH_3$, nitrogen gas, and a Group 18 inert gas are preferably mixed in a volume ratio of about 1:5:5:0.01 to 1.0.

After the plasma treating step above, the method may further include an oxygen plasma treating step in which the material is plasma treated in an oxygen atmosphere.

The plasma treating step may be performed at a pressure of about 0.2 to 2.5 Torr, in a frequency range of about 15 to 30 kHz, and at a temperature of about 50° C. to 300° C.

In the first mixture preparing step, the solvent may be a carbon-containing or a solvent not including carbon, in which case, when a carbon-free solvent is used in the first mixture preparing step, a carbon source gas may be further included in the second mixture preparing step.

Another embodiment of the present disclosure includes: a mixing step to prepare a mixture by mixing a solvent, a metal precursor, and a support; a first heating step to prepare a catalyst support by heating the mixture under vibration; a dispersing step to prepare a catalyst dispersion solution by dispersing the catalyst support in a reducing solution; and an electron beam applying step to irradiate the catalyst dispersion solution with an electron beam; a second heating step in which a mixture obtained through the electron beam applying step is filtered and then heated to prepare a functional catalyst support; and a synthesizing step in which a carbon nanotube is prepared by reacting the functional catalyst support with a carbon source.

The mixing step may be performed by mixing 0.1 to 2.0 parts by weight of the metal precursor in 100 parts by weight of the solvent to dissolve the metal precursor, followed by mixing 0.5 to 5.0 parts by weight of the support.

The first heating step may be performed in a multi-step heating method, in which the mixture is heated to a temperature range of 60° C. to 120° C. by applying vibration to the mixture and then heated to 150° C. to 250° C. by stopping the vibration.

The reducing solution may be an aqueous solution containing an alcohol having 1 to 3 carbon atoms and a reducing agent.

The reducing agent may include at least one of hydrazine, $LiBH_4$, $NaBH_4$, ethylene oxide, formaldehyde, formic acid, and polyol.

The electron beam may have a density of 100 to 500 $A/cm^2$, an acceleration voltage of 300 to 600 keV, and an irradiation time of 3 to 10 minutes.

The heating temperature in the second heating step may be in a range of 500° C. to 1000° C.

Between the second heating step and the synthesizing step, a plasma treating step of plasma treating the functional catalyst support may be further performed.

Another embodiment of the present disclosure relates to a method of manufacturing branched carbon nanotubes with enhanced hydrophilicity, including: a pretreating step of discharging an acidic solution mixed with carbon nanotubes in water; a heat treating step of preparing a support by heat treating the carbon nanotubes obtained through the pretreating step; a catalyst structure body preparing step in which a catalyst is supported on a support by mixing the support, a solvent, and a catalyst precursor, and then reducing the catalyst precursor; and a carbon nanotube synthesizing step of preparing a branched carbon nanotube by reacting the catalyst structure body with a carbon source.

The pretreating step may include: a first pretreating step of mixing the carbon nanotubes in an acidic solution and then treating them with ultrasonic waves; and a second pretreating step of discharging the mixture that has undergone the first pretreating step by plasma underwater.

The heat treating step may be a step of heat treating the pretreated carbon nanotubes in an oxygen atmosphere at a temperature in a range of 280° C. to 550° C. for 20 to 80 minutes.

The catalyst structure body preparing step may include: a first step of preparing a precursor mixture by mixing the support, the solvent, and the catalyst precursor; a second step of preparing a supported catalyst by drying the precursor mixture at a temperature in a range of 90° C. to 120° C.; a third step of preparing a catalyst structure body by mixing the supported catalyst with a reducing solution and then stirring; and a fourth step of filtering and washing the catalyst structure body.

The third step may be performed at a temperature in a range of 20° C. to 200° C.

The reducing agent may include at least one selected from the group consisting of hydrazine, $LiBH_4$, $NaBH_4$, ethylene oxide, formaldehyde, formic acid, and polyols.

Advantageous Effects

The continuous synthesizing method of carbon nanotubes of the present disclosure can prepare catalysts by reducing metal salts faster at a relatively low temperature, increase the yield of carbon nanotubes, and economically produce large quantities of carbon nanotubes by uniformly controlling the diameter of carbon nanotubes.

According to a method of manufacturing carbon nanotubes of another embodiment of the present disclosure, the particle size of the catalyst metal supported on a supported catalyst used for the synthesis of carbon nanotubes can be controlled so that carbon nanotubes of uniform size and performance can be manufactured, and the reactivity of the catalyst can be improved so that the synthesis yield of carbon nanotubes can be improved.

According to a manufacturing method of a branched carbon nanotube of another embodiment of the present disclosure, a carbon nanotube having a tree shape can be synthesized by forming a plurality of Y junctions on a straight carbon nanotube, and the carbon nanotube synthesized by this method has the advantages of excellent dispersibility due to improved hydrophilicity and specific surface area, and excellent stability and electrochemical efficiency when used as an electrochemical material.

MODE FOR INVENTION

Hereinafter, before being described in detail through a preferred embodiment of the present disclosure, it will be noted that terms or words used in the present specification and claims should not be limited to general or dictionary meanings but should be interpreted as meanings and concepts conforming to the technical idea of the present disclosure.

Throughout this specification, when a part "includes" a certain component, it means that other components may be further included rather than excluding other components unless otherwise stated.

Throughout this specification, the "%" used to indicate the concentration of a particular substance means (weight/weight) % for solid/solid, (weight/volume) % for solid/liquid, (volume/volume) % for liquid/liquid, (volume/volume) % for gas/gas, unless otherwise stated.

In general, a colloid is anything with particle size less than 0.45 μm (or 0.2 μm) and greater than 1000 Da (Dalton, the weight of one molecule), but in the specification of the present disclosure, the term "colloid" is used to mean a solution containing particles with particle sizes ranging from a few to several hundred nanometers, and sometimes even precursors thereof.

Hereinafter, an embodiment of the present disclosure will be described. However, the scope of the present disclosure is not limited to the following preferred embodiments, and those skilled in the art can implement various modified forms of the contents described herein within the scope of the present disclosure.

A method of continuously synthesizing carbon nanotubes according to one embodiment of the present disclosure, the method including: a plasma treating step to prepare metal nanoparticles by plasma treating a metal salt in an $H_2$ or $NH_3$ atmosphere; a first mixture preparation step to prepare an emulsion mixture by mixing a solvent and a surfactant; a second mixture preparing step of mixing the emulsion mixture with a carrier gas to prepare a second mixture; and a reacting step of introducing the second mixture and metal nanoparticles into a heated reactor to form carbon nanotubes.

The plasma treating step is a step of preparing metal nanoparticles by plasma treating a metal salt in an $H_2$ or $NH_3$ atmosphere.

The plasma state is called the fourth state of matter outside of solids, liquids, and gases and is composed of molecules, atoms, ions, electrons, and quantum particles, all in an electrically neutral state known as quasi-neutral. Plasma is classified into high-temperature plasma (equilibrium plasma) and low-temperature plasma (non-equilibrium plasma). High-temperature plasma is a plasma that induces high temperatures above 1000° C. and is mainly used in fields such as arc welding.

The power source for generating the plasma is not particularly limited, but a high-frequency alternating current, the high-frequency pulse generator may be used preferably a high-frequency bipolar direct current pulse generator.

The plasma treating is preferably performed in an $H_2$ or $NH_3$ atmosphere, and more preferably in a gaseous atmosphere in which the $H_2$ or $NH_3$ atmosphere further includes nitrogen gas and an 18th Group inert gas.

At this time, $H_2$ or $NH_3$, nitrogen gas, and the Group 18 inert gas are preferably mixed in a volume ratio of about 1 to 5:5:0.01 to 1.0, and more preferably can be mixed in a volume ratio of about 2:5:0.5. When $H_2$ or $NH_3$ is included in less than 1 v/v, the proportion of hydrogen radicals generated by the plasma treating may be reduced, resulting in smaller metal nanoparticles and a reduced yield of carbon nanotubes.

On the other hand, when $H_2$ or $NH_3$ is mixed with more than 5 v/v, the ratio of hydrogen radicals increases, resulting in an unstable gas phase atmosphere, which makes it difficult to control the size of the metal nanoparticles used as catalysts, and the diameter of the carbon nanotubes manufactured is not uniform.

At this time, $NH_3$ is decomposed into hydrogen and nitrogen while passing through the plasma, and the generated hydrogen radicals reduce metal salts to produce metal nanoparticles, while nitrogen provides a stable reaction environment to increase the rate of metal nanoparticle production.

In the above $H_2$ or $NH_3$ atmosphere, nitrogen gas and the Group 18 inert gases prevent impurities from forming due to the high reactivity of hydrogen radicals generated by plasma treating, prevent hydrogen gas from being generated again due to the reaction between hydrogen radicals, increase the generation rate of metal nanoparticles, and play a role in keeping the pressure stable before and after plasma treating.

In addition, Group 18 inert gas facilitates plasma generation, and helium (He), neon (Ne), argon (Ar), and the like are preferably used, and argon (Ar) is most preferably used but is not particularly limited thereto.

Meanwhile, after the plasma treating step in the $H_2$ or $NH_3$ atmosphere, an oxygen plasma treating step of plasma treatment in an oxygen atmosphere may be further included. At this time, $O_2$, $H_2O$, $O_3$, or nitrogen oxides such as $N_2O$, NO, and $NO_2$ can be supplied as oxygen atmosphere plasma forming gases, and $O_2$ or $H_2O$ is preferably used, but are not limited thereto. By preventing the generation of elements other than hydrogen, nitrogen, and oxygen through the plasma treating, the generation of impurities may be prevented, and the reactivity of the plasma treating may be maintained.

The plasma-forming gas not only helps to create and maintain the plasma, but the oxygen radicals generated from the oxygen gas can further generate metal salts that did not react in the plasma treating step into metal nanoparticles, thereby increasing the generation rate of metal nanoparticles.

In addition, by forming an oxide film on a certain part of the surface of the metal nanoparticles formed during the plasma treating step in an $H_2$ or $NH_3$ atmosphere, the agglomeration of the metal nanoparticles can be prevented.

Such oxygen gas may preferably be supplied at a flow rate of about 50 to 300 standard cubic centimeters per minute (sccm), and more preferably may be mixed at a flow rate of about 100 to 150 sccm. When oxygen gas is mixed at a flow rate of less than an oxide film may not be sufficiently formed on the surface of the metal nanoparticles, and thus, the agglomeration rate between the metal nanoparticles may increase.

On the other hand, when mixed at a flow rate higher than 300 sccm, the oxidation reaction of excess oxygen radicals can lead to the formation of a large oxide film on the surface of the metal nanoparticles, reducing the reactivity of the metal nanoparticles as a catalyst for the manufacturing carbon nanotubes.

The plasma treating step is preferably performed at a pressure of about 0.2 to 2.5 Torr, more preferably at a pressure of about 0.5 to 1.5 Torr. At pressures lower than 0.2 Torr, there are not enough radicals to form metal nanoparticles due to the lack of gas density around the plasma, and at pressures higher than 2.5 Torr, the kinetic energy of the gas molecules is higher, so water, hydrogen gas, etc., may be formed by excess hydrogen or oxygen radicals, reducing the reduction potential of metal salts and reducing the yield of carbon nanotubes.

Meanwhile, the plasma generation may preferably be performed at a frequency range of about 15 to 30 kHz and at a temperature in a range of about 50° C. to 300° C., and more preferably at a frequency range of about 20 to 30 kHz and at a temperature in a range of about 70° C. to 150° C. When the frequency is less than 15 kHz, no plasma is generated, or the plasma that is generated is not sustained for long and can be easily extinguished, and when the frequency exceeds 30 kHz, a plasma can be transited to arc plasma.

In addition, there may be a problem that the metal salt is not reduced because radicals are not produced at less than 50° C., and when the temperature exceeds 300° C., the plasma may transit to arc plasma.

The metal salt is a precursor of metal nanoparticles, which are catalysts for forming carbon nanotubes and is formed of fine particles with a metal particle size of 300 nm or less through a plasma treating step, and thus physical properties and performance of the particles may be different from those of the large particles. In particular, the surface area per unit mass is remarkably increased, the function is improved, and physical property changes, such as a decrease in the melting point of the particles and a change in color appear. These nanometer-sized fine metal particles have high reactivity and can exist in a suspended state in a gas phase, and thus can be used as a catalyst for synthesizing carbon nanotubes in a gas phase.

The metal salts may be any one or more of metal salts among the oxides, nitrides, borides, fluorides, bromides, sulfides, chlorides, and carbonate salts of at least one metal selected from the group consisting of iron (Fe), cobalt (Co), nickel (Ni), platinum (Pt), palladium (Pd), molybdenum (Mo), and vanadium (V).

These metal salts, either as such or in the form of metal oxides, can be reduced in contact with radicals formed by plasma treatment to produce metal nanoparticles. Due to their small size, the metal nanoparticles can be injected into the reactor in colloidal form, either on their own or mixed with other gases to form a gas phase. In this case, an inert gas such as argon, neon, helium, nitrogen, or a hydrocarbon may be used as the carrier gas, and a flow rate of about 30 to 450 sccm is preferred.

When the flow rate is out of the above range, the metal nanoparticles may not disperse or diffuse uniformly in the gas phase, resulting in a decrease in the yield of carbon nanotubes, an increase in the amount of catalyst not participating in the reaction, and a decrease in economic or process efficiency.

Meanwhile, the first mixture preparing step is a step of preparing an emulsion mixture by mixing a solvent and a surfactant.

The surfactant can prevent agglomeration of metal nanoparticles sprayed in colloidal form in a subsequent reacting step and adhere to the oxide film on the surface of metal nanoparticles that have undergone a plasma treating step further containing oxygen gas, thereby improving the reactivity of metal nanoparticles as catalysts.

At least one of nonionic surfactants, anionic surfactants, cationic surfactants, or amphoteric surfactants may be used as such surfactant, preferably a nonionic surfactant or an anionic surfactant may be used.

Polyoxyethylene, alkyl glucosides, alkyl polyglucosides, polyhydroxy fatty acid amides, alkoxylated fatty acid esters, sucrose esters, amine oxides, alcohol ethoxylates, amide ethoxylates, amine oxides, and alkyl glucosides may be used as the above nonionic surfactants. For example, methyl cocamide, C8 to C14 glucosamide, C8 to C14 alkyl polyglucoside, sucrose cocoate, sucrose laurate, lauramine oxide, cocamine oxide, and the like may be used as appropriate by one of ordinary skilled in the art, but are not limited thereto.

Anionic surfactants include alkyl sulfate-based, ethoxylated alkyl sulfate-based, alkyl ethoxy carboxylate-based, alkyl glyceryl ether sulfonate-based, ethoxyether sulfonate-based, methyl acyl taurate-based, alkyl sulfo succinate-based, alkylethoxy sulfosuccinate-based, alpha-sulfonated fatty acid-based, alkylphosphate ester-based, ethoxylated alkylphosphate ester-based, straight-chain alkylbenzene sulfonate-based, paraffin sulfonate-based, alpha-olefin sulfonate-based, alkylalkoxy sulfate-based, and the like may be used. For example, sodium lauryl sulfate, sodium laureth sulfate, sodium coco sulfate, and the like may be used, but are not limited thereto.

Cationic surfactants may include at least one selected from the group consisting of cetyl trimethylammonium bromide, decyl trimethylammonium bromide, dodecyl trimethylammonium bromide, didecyl dimethylammonium bromide, cetyl dimethyl ammonium chloride, lauryl dimethyl ammonium chloride, stearyl dimethyl ammonium chloride, tallow dimethyl ammonium chloride, ditallow dimethyl ammonium methyl sulfate, coconut ammonium chloride, stearamyropropyl PG-dimonium chloride phosphate, and stearamidopropyl ethyl dimonium ethosulfate, but are not necessarily limited thereto.

As amphoteric surfactants, alkylbethane-based, amidebethane-based, sulfobethane-based, hydroxysulfobethane-based, amidosulfobethane-based, phosphobethane-based, imidazoliniumbethane-based, aminopropionic acid-based, and amino acid-based surfactants may be used, but not limited thereto.

The surfactant may be used in an amount of 5 to 13 parts by weight relative to 100 parts by weight of the solvent, and when the content of the surfactant is less than 5 parts by weight, there may be a problem in that the metal nanoparticles agglomerate with each other and it is not easy to synthesize uniformly sized carbon nanotubes. On the other hand, when the surfactant content exceeds 13 parts by weight, the excess surfactant may actually reduce the function of the metal nanoparticles as catalysts, resulting in a decrease in the carbon nanotube yield.

As the solvent, a solvent that does not contain carbon may be used, or a solvent that contains carbon, such as aromatic hydrocarbons, aliphatic hydrocarbons, and alcohol compounds, may be used. Water is preferably used as a solvent, or at least one of ethanol ($C_2H_6O$), benzene ($C_6H_6$), toluene ($C_7H_8$), and xylene ($C_8H_{10}$) may be used but is not necessarily limited thereto.

The second mixture preparing step is a step of preparing a second mixture by mixing the emulsion mixture with a carrier gas. In this case, an inert gas such as argon, neon, helium, nitrogen, or a hydrocarbon may be used as the carrier gas, and a flow rate of about 30 to 450 sccm is preferred. The disadvantage is that when the flow rate is less than 30 sccm, the carrier gas content in the second mixture may be too low to facilitate the subsequent introduction of the second mixture into the reactor, and when the flow rate exceeds 450 sccm, the carrier gas usage is excessively increased, making the process uneconomical.

In this case, when water is used as a solvent, the second mixture preparing step may further include a carbon source gas, and the supply flow rate of the carbon source gas is preferably from about 35 to 280 sccm in consideration of the yield of carbon nanotubes, minimization of unreacted material, improvement of economy and productivity, etc.

As the carbon source gas, an organic compound selected from the group consisting of carbon monoxide, a saturated or unsaturated aliphatic hydrocarbon having 1 to 6 carbon atoms, or an aromatic hydrocarbon having 6 to 10 carbon atoms may be used. Such carbon source gases may also include about 1 to 3 heteroatoms selected from the group consisting of oxygen, nitrogen, chlorine, fluorine, and sulfur. At this time, a characterized gas such as $H_2$, $H_2S$, $NH_3$, and the like may be supplied together with the carbon source gas.

Meanwhile, the reacting step is a step of forming carbon nanotubes by introducing the second mixture and metal nanoparticles into a heated reactor.

The second mixture and the metal nanoparticles may be formed in the gas phase and introduced into the reactor by means of spraying or jetting, for example, and are preferably sprayed in colloidal form.

Meanwhile, depending on the temperature of the reactor, single-walled carbon nanotubes (SWNTs) or multi-walled carbon nanotubes (MWNTs) may be mainly produced. The temperature of the reactor is preferably maintained in a range of 600° C. to 1500° C., but the temperature of the reactor may be appropriately adjusted according to the characteristics of the carbon nanotubes to be produced. At this time, the process of manufacturing multi-walled carbon nanotubes (MWNTs) may be performed at a temperature of about 600° C. or more and less than 1000° C., more preferably in a temperature range of about 800° C. or more and less than 1000° C. At a temperature lower than 600° C., the amount of reactants not participating in the reaction increases, and the growth of carbon nanotubes is sluggish, so the yield may decrease.

The single-walled carbon nanotube (SWNT) is preferably manufactured at a temperature in a range of 1000° C. to 1500° C., and more preferably at a temperature in a range of 1000° C. to 1200° C. When the temperature is out of the above range, problems such as reduced yield due to poor growth of single-walled carbon nanotubes, reduced selectivity of carbon nanotubes, and difficulty in controlling diameter may occur.

Hereinafter, specific embodiments of the present disclosure will be mainly described. It is to be understood, however, that the scope of the disclosure is not limited to the following embodiments, which are presented by way of example only to illustrate the disclosure more particularly, and that one of ordinary skilled in the art will be able to practice many variations of what is described herein within the scope of the disclosure.

EXPERIMENTAL EXAMPLE 1

Metal nanoparticles were prepared by reducing $FeCl_3$ in a gaseous atmosphere containing hydrogen gas, nitrogen gas, or argon gas under conditions as shown in Table 1 below, with the pressure maintained at about 1.0 Torr, and by generating a plasma with a temperature of 100° C. using a high-frequency bipolar direct current pulse generator with a frequency of 22 kHz. The oxygen plasma treatment stage was performed in an oxygen atmosphere where 02 was supplied at a flow rate of 110 sccm for about 10 minutes while maintaining the frequency, temperature, pressure, etc. The water concentration (number/cm 3) of metal nanoparticles of about 15 to 100 nm size was measured for about 20 minutes using a portable connection particle counter (CPC, Kanomax Model 3800), and the metal nanoparticle generation rate (%) was calculated through Formula 1 below.

$$\text{Metal nanoparticle production rate } (\%)=\{(R_2-R_1)/R_1\}\times 100 \quad \text{(Formula 1)}$$

(Where $R_2$ is the number concentration of metal nanoparticles after the reaction, and $R_1$ is the number concentration of metal nanoparticles before the reaction.)

TABLE 1

| (v/v) | Hydrogen gas | Nitrogen gas | Argon gas | Metal nanoparticles production rate (%) |
|---|---|---|---|---|
| Comparative Example 1 | 2 | — | — | 72.3 |
| Comparative Example 2 | 2 | 5 | — | 78.6 |
| Comparative Example 3 | 2 | 5 | 0.005 | 81.9 |
| Example 1 | 2 | 5 | 0.01 | 90.4 |
| Example 2 | 2 | 5 | 0.1 | 93.5 |
| Example 3 | 2 | 5 | 0.3 | 95.0 |
| Example 4 | 2 | 5 | 0.45 | 97.8 |
| Example 5 | 2 | 5 | 0.5 | 98.1 |
| Example 6 | 2 | 5 | 0.55 | 97.4 |
| Example 7 | 2 | 5 | 0.07 | 94.2 |
| Example 8 | 2 | 5 | 0.1 | 91.1 |
| Example 9 | 2 | 5 | 1.0 | 90.5 |
| Comparative Example 4 | 2 | 5 | 1.3 | 87.1 |
| Comparative Example 5 | 2 | 5 | 1.7 | 79.9 |
| Comparative Example 6 | 2 | 5 | 2 | 71.7 |

As shown in Table 1, when the metal nanoparticle production rate was greater than 90%, it may be seen that hydrogen gas, nitrogen gas, and argon gas were mixed at a volume ratio (v/v) of about 2:5:0.01 to about 1.0.

On the other hand, in Comparative Example 1 and Comparative Example 2 including only hydrogen gas and nitrogen gas, the metal nanoparticle production rate was less than 80%, and in Comparative Examples 3 to 6 which the contents of hydrogen, nitrogen, and argon gases are outside the above range, the metal nanoparticle production rate was less than 90%.

Therefore, it was found that when hydrogen gas, nitrogen gas, and argon gas were mixed in a volume ratio (v/v) of about 2:5:0.011.0, the generation rate of metal nanoparticles was excellent, and the highest at a volume ratio (v/v) of about 2:5:0.5.

EXPERIMENTAL EXAMPLE 2

The results of manufacturing carbon nanotubes using metal nanoparticles prepared according to Examples 1 to 9 and Comparative Examples 1 to 6 of Example 1 as catalysts are shown in Table 2 below.

Metal nanoparticles were supplied by injecting argon, a carrier gas, into the reactor at a flow rate of 100 sccm. In addition, after mixing 6 parts by weight of alkyl glucoside with 100 parts by weight of benzene as a solvent, argon, a carrier gas, was sprayed at a flow rate of 100 sccm and supplied into the reactor, while the temperature of the reactor was maintained at 800° C.

The prepared carbon nanotubes were observed with a scanning electron microscope (SEM) to measure the diameter, and the carbon nanotube yield (%) was calculated through Formula 2 below.

Yield (%)={amount of produced carbon nanotubes (g)/amount of supplied metal salt (g)}×100 (Formula 2)

TABLE 2

| | Carbon nanotube Yield (%) | Diameter |
|---|---|---|
| Comparative Example 1 | 744 | 62.78 ± 20.5 |
| Comparative Example 2 | 1,699 | 62.27 ± 21.9 |
| Comparative Example 3 | 1,749 | 68.92 ± 18.0 |

hydrogen gas and nitrogen gas is 2:5, the content of argon gas that can simultaneously control the yield and diameter of carbon nanotubes by increasing the content of argon gas is in the range of 0.01 to 1.0 v/v, and the most excellent content of argon gas is 0.5 v/v.

EXPERIMENTAL EXAMPLE 3

Metal nanoparticles and carbon nanotubes were manufactured in the same manner as in Experiment 1 and Experiment 2 under the conditions shown in Table 3 below, and the metal nanoparticle production rate and carbon nanotube yield were calculated using Formulae 1 and 2, and the manufactured carbon nanotubes were observed under a scanning electron microscope (SEM) to measure the diameters.

TABLE 3

| (v/v) | Hydrogen gas | Nitrogen gas | Argon gas | Metal nanoparticle production rate (%) | Carbon nanotube yield (%) | Diameter (nm) |
|---|---|---|---|---|---|---|
| Comparative Example 7 | 0.5 | — | 0.5 | 90.2 | 1,628 | 62.51 ± 11.6 |
| Example 10 | 1 | 5 | 0.5 | 95.4 | 2,001 | 68.94 ± 9.7 |
| Example 5 | 2 | 5 | 0.5 | 98.1 | 2,122 | 69.98 ± 7.4 |
| Example 11 | 3 | 5 | 0.5 | 99.2 | 2,108 | 69.72 ± 8.6 |
| Example 12 | 5 | 5 | 0.5 | 99.2 | 2,074 | 68.86 ± 9.3 |
| Comparative Example 8 | 6 | 5 | 0.5 | 99.6 | 1,997 | 68.84 ± 16.4 |
| Comparative Example 9 | 8 | 5 | 0.5 | 99.8 | 1,804 | 67.47 ± 26.1 |

TABLE 2-continued

| | Carbon nanotube Yield (%) | Diameter |
|---|---|---|
| Example 1 | 1,905 | 70.98 ± 8.7 |
| Example 2 | 2,011 | 69.85 ± 8.4 |
| Example 3 | 2,075 | 70.23 ± 7.9 |
| Example 4 | 2,114 | 69.47 ± 8.0 |
| Example 5 | 2,122 | 69.98 ± 7.4 |
| Example 6 | 2,068 | 70.13 ± 7.7 |
| Example 7 | 2,081 | 70.29 ± 8.2 |
| Example 8 | 2,058 | 69.16 ± 8.9 |
| Example 9 | 2,003 | 68.92 ± 9.0 |
| Comparative Example 4 | 1,884 | 64.38 ± 11.7 |
| Comparative Example 5 | 1,694 | 66.64 ± 16.9 |
| Comparative Example 6 | 1,731 | 62.76 ± 19.6 |

As shown in Table 2 above, in the case of Examples 1 to 9, the yield of carbon nanotubes exceeded 2,000%, the diameter of the manufactured carbon nanotubes was constant at about 70 nm, and the standard deviation was also maintained between about 74 and 90. On the other hand, in the case of Examples 1 to 6, the yield of carbon nanotubes was less than 2,000%, the diameter of the carbon nanotubes was manufactured in the range of about 62 to 69 nm, and the standard deviation was calculated to be about 11 to 22, which confirms the difficulty in controlling the uniformity of the carbon nanotubes manufactured.

Through Comparative Examples 1 and 2, it was found that when nitrogen gas was added, the yield of carbon nanotubes increased by about 2 times or more, and when argon gas was added through Comparative Examples 2 and 3, the yield of and the diameter of the carbon nanotubes increased simultaneously.

Furthermore, through Comparative Examples 3 to 6 and Examples 1 to 9, it was found that when the volume ratio of As shown in Table 3 above, the yield of the carbon nanotubes manufactured according to Example 7 with a hydrogen gas content of less than 1 v/v was less than 2000%, and it can be seen that the diameter of the carbon nanotubes was not controlled.

On the other hand, in the case of Comparative Examples 8 and 9, where the hydrogen gas content exceeded 5 V/V, the metal nanoparticles production rate was quite high, about 995% or more, but the yield of carbon nanotubes was less than 2000%, and it was confirmed that the diameter of the prepared carbon nanotubes was not controlled smoothly.

Therefore, considering both the metal nanoparticle production rate, the carbon nanotube yield, and the carbon nanotube diameter control aspects, it was found that the results were excellent when the hydrogen gas content was about 1 to 5 V/V, as in the case of Example 5 and Examples 10 to 12, and that the measurement results were best when the volume ratio (v/v) of hydrogen gas, nitrogen gas, and argon gas was about 2:5:0.5, as in Example 5.

A method of manufacturing carbon nanotubes, according to another embodiment of the present disclosure, the method including: a mixing step of mixing a solvent, a metal precursor, and a support to prepare a mixture solution; a first heating step of heating the mixture solution under vibration to prepare a catalyst support; a dispersing step of dispersing the catalyst support in a reducing solution to prepare a catalyst dispersion solution; an electron beam irradiating step in which the catalyst dispersion solution is irradiated with an electron beam; a second heating step in which the mixture obtained through the electron beam irradiating step is filtered and then heated to produce a functional catalyst support; and a synthesizing step in which a carbon nanotube is manufactured by reacting the functional catalyst support with a carbon source.

First, the mixing step is a step of adsorbing the metal precursor to the support by mixing the solvent, the metal precursor, and the support. In this step, the mixture may be obtained by mixing 100 parts by weight of the solvent with 0.1 to 2.0 parts by weight of the metal precursor to uniformly disperse the metal precursor, followed by 0.5 to 5.0 parts by weight of the support, which, if performed in this order, may cause the metal precursor to being more uniformly dispersed and adsorbed on the support.

At this time, after mixing the support together, stirring may be performed for 30 minutes to 2 hours at a stirring speed of 300 to 600 rpm.

The solvent is used as a dispersion medium for adsorbing and supporting the metal precursor on the support by uniformly dispersing the support and the metal precursor and is at least one selected from the group consisting of aromatic hydrocarbons, aliphatic hydrocarbons, alcohol compounds, and water. For example, benzene, toluene, xylene, etc., may be used as aromatic hydrocarbons, hexane, heptane, octane, etc., may be used as aliphatic hydrocarbons, and ethanol, propyl alcohol, polyethylene glycol, etc., may be used as alcohol compounds.

In particular, it is preferable to use an alcohol compound as a solvent, and more preferably, polyethylene glycol may be used. In this case, the effect of uniformly dispersing the metal precursor in the solvent can be achieved without the use of a separate surfactant, thereby preventing the deterioration of the accessibility between the metal precursor and the support due to the surfactant, and no post-processing is required to remove the surfactant, which is more effective in terms of reaction efficiency and process efficiency.

The metal precursor is a metal salt that is a precursor of the catalyst for forming the carbon nanotubes, in which the metal salt may include at least one metal salt of oxides, nitrides, borides, fluorides, bromides, sulfides, chlorides, and carbonate salts of at least one metal selected from the group consisting of iron (Fe), cobalt (Co), nickel (Ni), platinum (Pt), palladium (Pd), molybdenum (Mo), and vanadium (V).

These metal precursors may be mixed in an amount of 0.1 to 2.0 parts per 100 parts of solvent, and it is preferred that the metal precursors are mixed in the above content in the mixing step since the amount of metal salt supported by the support is small when the content of the metal precursors is less than 0.1 part per 100 parts of solvent, and the support efficiency is low when the content of the metal precursors is more than 2.0 part per 100 parts of solvent since there is no additional increase in the amount of support.

The support is a support to which a metal precursor is adsorbed, and the type is not particularly limited but may be a carbon-based support, for example, being at least one or more selected from the group consisting of carbon black, activated carbon powder, carbon nanotube, carbon nanowire, and fullerene.

Such a support may be porous and preferably has a specific surface area in a range of 200 to 600 m 2/g in order to increase metal precursor supporting efficiency and carbon nanotube synthesizing efficiency.

The porous support may preferably be a carbon-based support whose specific surface area is increased by ozonation, and in this case, ozonation of the carbon-based support has the advantage that the specific surface area is not only increased by ozone but also has the advantage of further improving the adsorption efficiency when the metal catalyst is subsequently adsorbed due to the introduction of oxygen-based functional groups.

Specifically, it is preferable to supply ozone at a flow rate of 80 to 250 mg/min at a temperature of 250° C. to 380° C. to the carbon-based support as described above and ozonate the support for 1 to 4 hours. At this time, if the flow rate of ozone is less than 80 mg/min, the processing time increases excessively, and the workability decreases, and if the flow rate of ozone exceeds 250 mg/min, the pressure in the reactor increases rapidly, and it is difficult to preserve the porous support powder.

In addition, when the ozonation time is less than 1 hour, the effect of increasing the specific surface area and introducing functional groups by ozone is insignificant, and when the ozonation time exceeds 4 hours, the specific surface area may decrease due to the closure of micropores on the surface of the carbon-based support, so it is preferable to perform the ozonation treatment under the conditions described above.

Next, the first heating step is to prepare the catalyst support by heating the mixture obtained through the previous mixing step by applying vibration.

By heating under vibration in this step, agglomeration between the metal precursor and the support or agglomeration between the support and the support is prevented in the process of adsorption of the metal precursor to the support, so that the metal precursor is uniformly dispersed and adsorbed on the support, and a catalyst support of a more constant size can be formed, which has the advantage of improving the reliability of the carbon nanotubes since carbon nanotubes with a constant size and constant properties are synthesized in the subsequent synthesis of carbon nanotubes.

This step can be performed in a multi-step heating method, specifically, the mixture solution is vibrated and heated to a temperature range of 60° C. to 120° C. for 10 to 80 minutes, then the vibrations are stopped and the mixture solution is heated to 150° C. to 250° C. for 1 to 30 hours.

This primary vibration and heating at relatively low temperatures allow for uniform dispersion and adsorption of the metal precursor on the support. Furthermore, by heating to the temperature range as described above, solvent losses can be minimized while improving the adsorption efficiency of the metal precursor to the support by heat.

Then, by secondarily heating to a relatively high temperature while eliminating vibration, the solvent can be completely removed to form a particulate catalyst support, and the absence of vibration prevents damage to the support due to collision between the supports, dislodging of the metal precursor, etc.

At this time, the vibration may be applied by vibrating the reactor containing the mixture solution in a vertical or horizontal direction, preferably with an amplitude of 0.5 to 5 mm and a frequency of 0.5 to 5 kHz. When the intensity of the vibration is small, the dispersion effect obtained by applying the vibration is insignificant, and especially when the frequency exceeds 5 kHz, the damage to the support is caused by the collision energy generated by the collision of the support with each other in the mixture solution, and the size of the support is uneven, so it is desirable to apply the vibration under the above conditions.

Next, a dispersing step of preparing a catalyst dispersion solution by dispersing the catalyst support obtained through the first heating step in a reducing solution is performed. Through this step, the metal precursor may be reduced to the metal, and at the same time, the catalytic activity may be improved.

The reducing solution is an aqueous solution containing an alcohol having 1 to 3 carbon atoms and a reducing agent, and the alcohol having 1 to 3 carbon atoms may be at least one or more selected from the group consisting of methanol, ethanol, and propanol, and the reducing agent may be at least one or more of hydrazine, $LiBH_4$, $NaBH_4$, ethylene oxide, formaldehyde, formic acid, and polyol.

The reducing solution may include 1 to 30 parts by weight of alcohol and 0.01 to 1 part by weight of a reducing agent per 100 parts by weight of water. By using an aqueous alcohol solution instead of water as a solvent for the reducing solution, the catalyst support can be uniformly dispersed in the reducing solution without a separate surfactant. In addition, since active species generated in the subsequent electron beam irradiating step can be controlled by alcohol, damage to the catalyst support can be prevented, and since no impurities are generated, a catalyst support with higher purity can be produced.

Next, an electron beam irradiating step of irradiating the catalyst dispersion solution with an electron beam is performed. This step involves irradiating the catalyst dispersion with an electron beam to control the particle diameter of the reduced metal and the particle diameter of the support in order to form carbon nanotubes of consistent and uniform size and properties in the subsequent carbon nanotube synthesizing step. In addition, the strength of the support itself can be improved by strengthening the molecular bonds of the support that are connected by weak bonds by electron beam irradiation.

In this step, the electron beam applied to the catalyst dispersion may have a density current amount of 100 to 500 A/cm 2, an accelerating voltage of 300 to 600 keV, and an irradiation time of 3 to 10 minutes.

When the density current amount, acceleration voltage, and irradiation time of the electron beam are less than the above range, it is difficult to obtain the above effects by electron beam irradiation, and when the above range is exceeded, excessive electron beam irradiation may cause problems such as breaking the bond between the metal and the support or damaging the support, so it is preferable to apply the electron beam under conditions within the above range.

Next, a second heating step is performed in which the mixture obtained through the electron beam irradiating step is filtered and then heated to prepare a functional catalyst support.

The second heating step is a step of preparing a functional catalyst support in which metal particles, which are catalysts, are coated on the surface and pores of the support by heating catalyst support particles obtained by filtering the mixture obtained through the electron beam irradiating step.

In this step, the heating temperature may be 500° C. to 1000° C., preferably 800° C. to 1000° C., and it has the advantage that by heating in such a temperature range, the crystallinity of the support itself increases, thereby improving the strength of the support, while at the same time obtaining a functional catalyst support of the form described above. At this time, when the heating temperature exceeds 1000° C., pores may be rather closed due to excessive crystallization, and the specific surface area of the support may decrease. Therefore, heat treating is preferably performed in the above-described temperature range.

In the second heating step, heating may be performed for 1 to 18 hours, preferably 2 to 10 hours.

Then, a synthesizing step may be performed to synthesize the carbon nanotubes by reacting the functional catalyst support obtained by the second heating step with a carbon source. A plasma treating step may be further performed between the second heating step and the synthesizing step to plasma treat the functional catalyst support, and in such a plasma treating step, the strength of the support itself may be improved, and the bonding force between the metal and the support may be improved.

At this time, plasma treating is preferably performed under a vacuum of 1 to 100 Torr and a temperature of 200° C. to 500° C. in a nitrogen or inert gas atmosphere, and when performed under these conditions, performance enhancement effects can be obtained without damage to the support or metal.

Finally, the synthesizing step is a step of synthesizing carbon nanotubes by reacting the functional catalyst support obtained through the above process with a carbon source using the metal supported on the functional catalyst support as a catalyst. Through this, carbon nanotubes having a uniform particle size and physical properties can be synthesized.

The method of synthesizing the carbon nanotubes in this step is not particularly limited and may be applied to, for example, arc discharge method, laser vaporization method, CVD method, catalytic synthesis method, plasma synthesizing method, continuous vapor synthesizing method, etc., but is not limited thereto.

For example, carbon nanotubes may be manufactured by putting the functional catalyst support in a quartz boat and placing the quartz boat inside a reactor.

For example, continuous carbon nanotubes manufacturing may be performed by dispersing the functional catalyst support in a solvent and continuously supplying the functional catalyst support into a reactor while proceeding with a carbon nanotube synthesizing reaction.

In this case, the functional catalyst support is made in the form of a colloidal solution in a solvent such as water or an organic solvent, which is finely dispersed or sprayed into the reactor to make the particle droplets of the colloidal solution suspended in the gas, and they exist as gas-phase colloids for a period of time, thereby enabling the continuous synthesis of two-dimensional or three-dimensional carbon nanotubes in the gas phase.

A method of making the dispersion solution or colloidal solution obtained by dispersing the functional catalyst support in a solvent into a gas phase, or suspending the dispersion solution in a gas, is not particularly limited and can be performed by any method known in the art, such as direct spraying, siphon spraying, atomization, and the like.

On the other hand, when dispersing the functional catalyst support in a solvent such as water or an organic solvent, a surfactant may be added in an amount that does not adversely affect the carbon nanotube synthesizing reaction in order to prevent agglomeration and uniform dispersion of the functional catalyst support. The type of surfactant used at this time is not particularly limited.

In the carbon nanotube synthesizing step, the carbon source may be an organic compound selected from the group consisting of, for example, carbon monoxide, a saturated or unsaturated aliphatic hydrocarbon having 1 to 6 carbon atoms, or an aromatic hydrocarbon having 6 to 10 carbon atoms, and such carbon source may have 1 to 3 heteroatoms selected from the group consisting of oxygen, nitrogen, chlorine, fluorine, and sulfur. These carbon sources may partially or completely replace the solvent in the colloidal solution or may be further mixed, and in the case of further mixing, the carbon sources may be introduced together into the reactor when the colloidal solution is sprayed into the reactor, and the reaction occurs.

In particular, when water is used as a solvent for colloidal solutions, a separate carbon source must be supplied during the reaction.

PREPARATION EXAMPLE 1

Production of Functional Catalyst Support

A mixture of 100 parts by weight of polyethylene glycol and 0.5 parts by weight of $FeCl_3$, a metal precursor, was mixed with 1.0 parts by weight of a support, and stirring was performed at a speed of 380 rpm for 90 minutes to adsorb the metal precursor onto the support. At this time, as the support, carbon nanotubes having a BET specific surface area of 370 $m^2/g$ ozonated for 200 minutes at a flow rate of 100 mg/min at 280° C. were used.

Next, the mixture solution of the above polyethylene glycol, metal precursor, and support was heated to 78° C., and a vibration with an amplitude of 2 mm and a frequency of 2.3 kHz was applied for 30 min to make the mixture solution uniformly dispersed, and then the vibration was stopped, and the mixture solution was raised to 180° C. and heated for 8 hours to obtain a catalyst support in which the metal precursor was uniformly adsorbed on the support.

Then, the catalyst support was mixed in a reducing solution in which 100 parts by weight of water, 5 parts by weight of methanol, and 0.05 parts by weight of $LiBH_4$ as a reducing agent were mixed at a weight ratio of 100:5, and an electron beam of density current 230 A/cm 2 and an acceleration voltage of 400 keV was applied for 7 minutes.

Next, the mixture was filtered, and the powder component was heated at 850° C. for 4 hours to produce a functional catalyst support.

Carbon Nanotube Synthesis 0.25 g of the previously produced catalyst structure body was placed in a quartz boat, placed in the center of a 27 mm diameter quartz tube located in the furnace, and the temperature of the furnace was increased to 800° C. by supplying argon (Ar) gas at a flow rate of 100 ml/min.

Then, while argon (Ar) gas containing 2 vol % of vaporized benzene was injected into the reactor, carbon nanotubes were synthesized for 30 minutes.

EXPERIMENTAL EXAMPLE 4

The carbon nanotubes were synthesized using the same method as in Example 1 above, but the electron beam irradiation conditions were varied as shown in Table 4, and the carbon nanotubes were synthesized using each functional catalyst support using the same method as in the previous Example, and the diameter distribution and BET specific surface area of each carbon nanotube were measured, and the synthesis yield was calculated, and the results are shown in Table 4. At this time, in Table 4, Comparative Example 11 is a case in which the functional catalyst support was used by omitting the electron beam irradiating step. Scanning electron microscopy (SEM) photographs of each synthesized carbon nanotube were taken, and the diameters of 10 random strands, including the thinnest and thickest, were measured, and the mean values and standard deviations were calculated and listed in Table 4.

Synthesis yield (%)=[amount of manufactured carbon nanotubes (g)/amount of supplied metal salt (g)]×100 (Formula 3)

TABLE 4

| | Density current (A/cm$^2$) | Irradiation time (minutes) | BET specific surface area (m$^2$/g) | Diameter distribution Average value (nm) | Diameter distribution Standard deviation | Synthesis yield (%) |
|---|---|---|---|---|---|---|
| Example 11 | 230 | 7 | 450 | 62.8 | 9.6 | 1,526 |
| Example 12 | 250 | 9 | 444 | 65.5 | 8.8 | 1,458 |
| Example 13 | 280 | 4 | 459 | 65.1 | 9.7 | 1,424 |
| Comparative Example 11 | — | — | 306 | 68.5 | 45.2 | 1,035 |
| Comparative Example 12 | 80 | 5 | 428 | 63.2 | 25.5 | 1,128 |
| Comparative Example 13 | 550 | 4 | 355 | 61.7 | 18.2 | 1,366 |
| Comparative Example 14 | 280 | 2 | 436 | 65.7 | 19.5 | 1,141 |
| Comparative Example 15 | 250 | 11 | 328 | 60.8 | 12.5 | 985 |

Referring to the experimental results in Table 4, it was found that in Examples 11 to 13, carbon nanotubes having a high specific surface area and a uniform diameter distribution were obtained.

On the other hand, in the case of Comparative Examples 11 to 15, the diameter distribution was non-uniform, and the synthesis yield was low, and the specific surface area of Comparative Examples 11, 13, and 15 were significantly lower than that of other samples.

In particular, when Example 12 and Comparative Example 15 are compared together, it is found that when the density current amount is the same and the irradiation time exceeds 10 minutes, the specific surface area decreases rapidly, the uniformity of the diameter distribution decreases, and the synthesis yield decreases significantly, which is believed to be the result of problems such as damage to the support or changes in the bonding structure of the catalyst metal due to the excessively long electron beam irradiation time.

Furthermore, when Example 13 and Comparative Example 14 are examined together, it is found that the diameter distribution and synthesis yield are significantly reduced even when the irradiation time is less than 3 minutes, which is believed to be due to the fact that the particle size of the reduced metal is not controlled by the electron beam irradiation due to the excessively short irradiation time.

Therefore, from the present experimental results, it can be confirmed that in order to improve the specific surface area of the carbon nanotubes in the synthesis of carbon nanotubes, uniformize the diameter distribution, and improve the synthesis yield, in the electron beam irradiating step of the method for manufacturing carbon nanotubes according to one embodiment of the present disclosure, the electron beam is preferably applied for 3 to 10 minutes under the condition of a density current amount of 100 to 500 A/cm 2 and an acceleration voltage of 300 to 600 keV.

Another embodiment of the present disclosure is a method of manufacturing a branched carbon nanotube with improved hydrophilicity, in which a plurality of Y junctions is formed on a straight central carbon nanotube, and branch carbon nanotubes extending from the central carbon nanotube are formed at these Y junctions to form a branched carbon nanotube having an overall tree-like shape.

These branched carbon nanotubes have a plurality of Y junctions and have excellent stability and electrochemical efficiency when used as an electrochemical material.

A method of manufacturing branched carbon nanotubes according to one embodiment of the present disclosure, the method including: a pretreating step of immersing the carbon nanotubes in an acidic solution; a heat treating step of heat treating the carbon nanotubes obtained through the pretreating step to prepare a support; a catalyst structure body manufacturing step of preparing a catalyst structure body in which a catalyst is bound to a support by mixing the support with a solvent and a catalyst precursor and reducing the catalyst precursor; and a carbon nanotube synthesizing step of manufacturing a branched carbon nanotube by reacting the catalyst structure body with a carbon source.

First, the pretreating step is performed by immersing the carbon nanotubes in an acidic solution to create physical defects on the surface of the carbon nanotubes used as supports for the catalyst in order to adsorb the metal catalyst particles to the defect sites in a later step and to induce the growth of branching carbon nanotubes.

Specifically, this step includes: a first pretreating step in which the carbon nanotubes are immersed in an acidic solution and sonicated; and a second pretreating step of discharging the mixture subjected to the first pretreatment step into underwater plasma.

The first pretreating step is to immerse the carbon nanotubes in an acidic solution and sonicate them to uniformly disperse the carbon nanotubes in the acidic solution, in which the acidic solution may be an aqueous solution of a weak acid including at least one weak acid selected from the group consisting of acetic acid, formic acid, lactic acid, benzoic acid, propionic acid, citric acid, malonic acid, adipic acid, and tartaric acid.

When the acidic solution used in the first pretreating step is an aqueous solution of a strong acid including sulfuric acid, hydrochloric acid, nitric acid, or phosphoric acid, physical defects of the carbon nanotubes can be induced by the first pretreating step alone, but there is a problem that the amount of physical defects is excessively increased due to the strong acid and a brush or brush-like carbon nanotube with a central carbon nanotube as a center is formed instead of a branched carbon nanotube, so it is preferable to use the weak acidic aqueous solution described above as the acidic solution.

The first pretreating step can be performed at 80° C. to 130° C. for 1 to 5 hours, during which the carbon nanotubes are uniformly dispersed and hydrophilic functional groups are bonded to the carbon nanotubes by the simultaneous action of heat and a weak acid, giving the carbon nanotubes hydrophilic properties.

The second pretreating step is to generate radicals by generating a pulsed underwater plasma discharge in an aqueous solution of a weak acid in which the carbon nanotubes are immersed and to cause more physical defects in the carbon nanotubes by the radicals generated. At the same time, the radicals generated by the plasma discharge bind to the physical defects of the carbon nanotubes and hydrophilize the carbon nanotubes to be used as supports, thereby improving the hydrophilicity of the resulting branched carbon nanotubes and enhancing their dispersibility in various solvents.

In addition, since various contaminants included in the mixture used for the reaction are removed through the plasma discharge, there is an advantage in that more pure and stable support can be manufactured.

At this stage, the underwater plasma discharge can be applied with a frequency of 3 to 6 kHz, a pulse width of 3 to 5 seconds, and a power of 600 to 1200 W. These plasma discharge conditions induce the generation of plasma and the formation of physical defects in the carbon nanotubes by the plasma discharge. At the same time, it is desirable to maintain the above discharge conditions during the underwater plasma discharge, as it is a condition for shaping the final branched carbon nanotubes into a branched shape with a plurality of Y junctions rather than a brush or brush shape or a straight shape.

The second pretreating step may be performed at a temperature range of 10° C. to 60° C. for a period of 30 minutes to 2 hours. It is preferred that the plasma treating is performed during the above-described process time since the formation rate of physical defects is low when the process is performed at a temperature lower than the above-described temperature conditions or for a shorter period of time, and the formation of branched structures is prevented due to excessive defect formation when the process is performed at a temperature higher than the above-described temperature conditions or for a longer period of time, which results in a deterioration of the physical and electrical properties of the carbon nanotubes finally obtained.

Next, a heat treating step of preparing a support by heat treating the carbon nanotubes obtained through the pretreating step is performed. The carbon nanotubes obtained through the pretreating step can be filtered and washed before being used for the heat treating step, which removes contaminants and amorphous carbon on the surface of the carbon nanotubes to obtain more pure carbon nanotubes. The carbon nanotubes obtained here are used as supports for supporting catalysts in a later step.

In this step, the pretreated carbon nanotubes are heat treated under an oxygen atmosphere for 20 to 80 minutes at a temperature range of 280° C. to 550° C., where oxygen atmosphere means oxygen alone or a gas containing oxygen, such as air. Since the carbon nanotubes are heat treated under an oxygen atmosphere, the functional groups that confer hydrophilicity to the surface of the carbon nanotubes are retained so that the hydrophilicity of the carbon nanotubes used as support can be maintained in subsequent steps.

At this step, when the heat treating temperature or time is below the above range, the purification effect is minimal, and when the temperature or time exceeds the above range, there is a problem that the physical properties or hydrophilicity of the carbon nanotube to be used as a support may be deteriorated by excessive heat treating, so it is desirable to perform the heat treating within the process conditions described above.

The catalyst structure body preparing step is a step of forming a catalyst structure body in which the catalyst is bonded to the support by mixing the carbon nanotubes obtained through the heat treating step, that is, the support together with a solvent and a catalyst precursor. Through this step, the catalyst precursor is bound and reduced to the region where the physical defect of the carbon nanotube occurs so this region acts as a Y-junction formation region and enables the manufacturing of the branched carbon nanotubes.

This step is performed in a multi-step manner and specifically includes: a first step of mixing the support with a solvent and a catalyst precursor to prepare a precursor mixture; a second step of drying the precursor mixture at a temperature range of 90° C. to 120° C. to prepare a support catalyst; a third step of mixing the support catalyst with a reducing solution and stirring to prepare a catalyst structure body; and a fourth step of filtering and washing the catalyst structure body.

First, the first step is a step of preparing a precursor mixture by mixing the support, solvent, and catalyst precursor. The support is a carbon nanotube obtained through the previous heat treating step.

The solvent is used as a dispersion medium for adsorbing and supporting the metal precursor on the support by uniformly dispersing the support and the catalyst precursor and is at least one selected from the group consisting of aromatic hydrocarbons, aliphatic hydrocarbons, alcohol compounds, and water. For example, benzene, toluene, xylene, etc., may be used as aromatic hydrocarbons, hexane, heptane, octane, etc., may be used as aliphatic hydrocarbons, and ethanol, propyl alcohol, polyethylene glycol, etc., may be used as alcohol compounds.

In particular, it is preferable to use an alcohol compound, particularly polyethylene glycol, as a solvent. In this case, the catalyst precursor can be uniformly dispersed in the solvent without using a separate surfactant. Accordingly, it is possible to prevent deterioration of accessibility between the catalyst precursor and the support by the surfactant, and since a post-process for removing the surfactant is not required, it is more effective in terms of reaction efficiency and process efficiency.

The catalyst precursor is a metal salt that is a precursor of the catalyst for forming the carbon nanotubes, in which the metal salt may include at least one metal salt of oxides, nitrides, borides, fluorides, bromides, sulfides, chlorides, and carbonate salts of at least one metal selected from the group consisting of iron (Fe), cobalt (Co), nickel (Ni), platinum (Pt), palladium (Pd), molybdenum (Mo), and vanadium (V).

In this step, the precursor mixture may include 0.1 to 10 parts by weight of the support and 0.1 to 1.2 parts by weight of the catalyst precursor per 100 parts by weight of the solvent. When the content of the support in the precursor mixture is less than 0.1 part by weight, the productivity of the supported catalyst is lowered, and when the content of the support exceeds 10 parts by weight, the catalyst adsorption efficiency to the support is lowered even if the content of the catalyst precursor is increased, so it is preferable to include the content of the support within the above weight range. At this time, in order to maximize such an effect, more preferably, the support may be included in an amount of 0.5 to 3 parts by weight.

Since the amount of the catalyst precursor is also within a range to maximize the supporting efficiency of the support, the precursor mixture preferably includes components within the above-described content range.

This step can be performed by first mixing the solvent and the catalyst precursor, and then mixing the support into this mixture and stirring at a stirring speed of 300 to 600 rpm for 2 to 4 hours. Through this step, a physical defect is caused by the underwater plasma discharge, and the catalyst precursor, which is a metal salt, can be adsorbed by the radicals formed at the physical defect site, and the catalyst metal can be bound to the physical defect site in the subsequent reduction process.

At this step, the precursor mixture may further include a catalyst functional enhancer, which helps the metal precursor to adsorb onto the support in a uniform and constant size in a solvent environment without separate surfactants and prevents excessive agglomeration of metal particles during the reduction process. Therefore, when a catalyst functional enhancer is added, carbon nanotubes with uniform physical properties can be grown, and the yield of branched carbon nanotubes can be increased.

Such catalytic functional enhancers may include at least one of indole, imidazole, and hectorite compounds, in which case the hectorite compounds may include 2-hydrogenated tallowbenzylmonium hectorite, disteardimonium hectorite, quaternium-18 hectorite, or stearalkonium hectorite.

The catalyst functional enhancer may be mixed together in the mixing step of the solvent and the catalyst precursor and may be included in an amount of 17 to 58 parts by weight per 100 parts by weight of the catalyst precursor.

Preferably, at least one first compound selected from the group consisting of indole and imidazole and a second compound that is a hectorite compound may be used together since such a combination results in a better effect than when the first and second compounds were each used alone.

In this case, the first compound and the second compound can be mixed in a weight ratio of 1:0.3 to 0.7, and when used in a range outside this mixing ratio, the effect of improving the catalytic function is rather poor due to factors such as stability deterioration, and it is difficult to see the effect of improving the carbon nanotube yield, so it is preferable to use them together within the weight range described above.

Next, the second step is a step of obtaining a supported catalyst by filtering and drying the mixture obtained through the first step. In this step, drying can be performed at a temperature range of 90° C. to 120° C. for 2 to 10 hours, which minimizes the adsorption of the catalyst precursor to the sites where the support is not physically defective, allowing the subsequent growth of branched carbon nanotubes only in the sites where the support is physically defective, and after this step, the supported catalyst in the form of a dry powder can be obtained.

Next, the third step is a step of preparing a catalyst structure body by mixing the supported catalyst obtained through the second step with a reducing solution and stirring to reduce the catalyst precursor to a catalyst metal.

This step may be performed by mixing the supported catalyst with the reducing solution and heating and stirring for 1 to 4 hours at a stirring speed of 300 to 600 rpm in a temperature range of 20° C. to 200° C.

In this step, the reducing solution includes a solvent and a reducing agent and may include at least one of hydrazine, $LiBH_4$, NaBH 4, ethylene oxide, formaldehyde, formic acid, and polyol.

The reducing solution may include 0.01 to 0.5 parts by weight of the reducing agent relative to 100 parts by weight of the solvent. When the content of the reducing agent is out of the above weight range, it is preferable that the reducing agent is included within the above weight range because a sufficient reduction of the metal salt does not occur or economic efficiency is reduced.

The fourth step is a step of removing an unreacted reducing agent by filtering the catalyst structure body from the mixture obtained through the third step and washing with a solvent. At this time, the solvent used for the reducing solution may be used as the solvent used for washing.

On the other hand, the above step of synthesizing carbon nanotubes is a step of synthesizing carbon nanotube branches from a physical defect region of the catalyst structure by reacting the previously obtained catalyst structure with a carbon source and a branched carbon nanotube having a plurality of Y junctions can be synthesized through this step.

The method of synthesizing the carbon nanotubes in this step is not particularly limited, and may be applied to, for example, arc discharge method, laser vaporization method, CVD method, catalytic synthesis method, plasma synthesis method, continuous vapor synthesis method, etc., but is not limited thereto.

For example, carbon nanotubes may be manufactured by placing the catalyst structure in a quartz boat and placing the quartz boat inside a reactor.

For example, continuous manufacturing two-dimensional or three-dimensional Y-branched carbon nanotubes can be performed by dispersing the catalyst structure body in a solvent and continuously supplying the dispersant into a reactor to proceed with a carbon nanotube synthesis reaction.

In this case, the catalyst structure body is made in the form of a colloidal solution in a solvent such as water or an organic solvent, which is finely dispersed or sprayed into the reactor to make the particle droplets of the colloidal solution suspended in the gas, and they exist as gas phase colloids for a period of time, thereby enabling the continuous synthesis of two-dimensional or three-dimensional carbon nanotubes in the gas phase.

A method of making the dispersion solution or colloidal solution obtained by dispersing the catalyst structure body in a solvent into a gas phase, or suspending the dispersion solution in a gas, is not particularly limited and can be performed by any method known in the art, such as direct spraying, siphon spraying, atomization, and the like.

On the other hand, when dispersing the catalyst structure body in a solvent such as water or an organic solvent, a surfactant may be added in an amount that does not adversely affect the carbon nanotube synthesizing reaction in order to prevent agglomeration and uniform dispersion of the catalyst structure body. The type of surfactant used at this time is not particularly limited.

In the carbon nanotube synthesizing step, the carbon source may be an organic compound selected from the group consisting of, for example, carbon monoxide, a saturated or unsaturated aliphatic hydrocarbon having 1 to 6 carbon atoms, or an aromatic hydrocarbon having 6 to 10 carbon atoms, and such carbon source may have 1 to 3 heteroatoms selected from the group consisting of oxygen, nitrogen, chlorine, fluorine, and sulfur. These carbon sources may partially or completely replace the solvent in the colloidal solution or may be further mixed, and in the case of further mixing, the carbon sources may be introduced together into the reactor when the colloidal solution is sprayed into the reactor, and the reaction occurs. In particular, when water is used as a solvent for colloidal solutions, a separate carbon source must be supplied during the reaction.

PREPARATION EXAMPLE 2

Production of Catalyst Structure Body

First, the carbon nanotubes were immersed in an aqueous propionic acid solution, heated to 90° C., and ultrasonicated for 2 hours. Thereafter, the temperature was then lowered to 35° C., and an underwater plasma was generated with a frequency of 5 kHz, a pulse width of 4 seconds, and a power of 800 W for a total of minutes to induce physical defects in the carbon nanotubes, which were then filtered and washed with water to prepare carbon nanotubes with physical defects, which were then heat treated in an oxygen atmosphere at 450° C. for 60 minutes to prepare the support.

Next, 0.5 parts by weight of catalyst precursor, $FeCl_3$, was mixed with 100 parts by weight of polyethylene glycol as a solvent, 4.5 parts by weight of the support was mixed, and stirred for 3 hours at a stirring speed of 400 rpm to prepare a precursor mixture.

Next, the precursor mixture was filtered and dried at 105° C. for 4 hours to obtain a supported catalyst, which was mixed with a reducing solution and stirred at 120° C. for 2 hours at a stirring speed of 400 rpm to reduce the catalyst precursor to produce a catalyst structure body. At this time, as the reducing solution, a reducing solution containing 0.2 parts by weight of $LiBH_4$ as a reducing agent based on 100 parts by weight of polyethylene glycol was used.

Next, a catalyst structure body was finally produced by filtering the catalyst structure body from the mixture and washing with polyethylene glycol.

Carbon Nanotube Synthesis 0.25 g of the previously produced catalyst structure body was placed in a quartz boat and placed in the center of a 27 mm diameter quartz tube located in the furnace, and the temperature of the furnace was increased to 1000° C. by supplying helium gas at a flow rate of 100 ml/min.

Then, while injecting hydrogen gas containing 2 vol % of vaporized benzene into the reactor, carbon nanotubes were synthesized for 30 minutes.

EXPERIMENTAL EXAMPLE 5

A catalyst structure body was prepared using the same method as in Preparation Example 2, but the catalyst structure body was produced by changing the underwater plasma application conditions in the catalyst structure body preparing step as shown in Table below. Thereafter, carbon nanotubes were synthesized using the catalyst structure body of each Example and Comparative Example as a catalyst, using the same method as in Example 2, and the synthesis yield, surface resistance, BET specific surface area, and water dispersion of the carbon nanotubes were measured, and the results are shown in Table 5.

The synthesis yield was confirmed by calculating according to the following Formula (4).

$$\text{Synthesis yield (\%)}=[\text{amount of manufactured carbon nanotubes (g)}/\text{amount of supplied metal salt (g)}]\times 100 \quad \text{(Formula 4)}$$

The surface resistivity was measured by heating and molding a mixture of 2.7% by weight of carbon nanotubes, 96.5% by weight of polycarbonate polymer, and 0.8% by weight of additives including stabilizers, lubricants, and antioxidants to produce specimens with a thickness of 3.0 mm and a length of 11.4 mm, and then measuring the surface resistivity of each specimen using an SRM-110 (Pinion).

The water dispersibility was determined by mixing each carbon nanotube in water at a concentration of 0.1% by weight, dispersing for 1 minute with an ultrasonic wave having an output of 110 W at 20 KHz, and then determining whether precipitates were generated. It was evaluated as X when the precipitate occurred and as O when the precipitate did not occur.

TABLE 5

| | Plasma application conditions | | Measurement result | | | |
|---|---|---|---|---|---|---|
| | Frequency (kHz) | Pulse width (seconds) | Synthesis yield (%) | Surface resistance (Ω/sq.) | Specific surface area ($m^2/g$) | Water dispersibility |
| Example 21 | 5 | 4 | 1,012 | $10^4$ or less | 495 | O |
| Example 22 | 4 | 4 | 958 | 10 or less | 511 | O |
| Comparative Example 21 | 2 | 4 | 941 | $2.7 \times 10^5$ | 389 | X |
| Comparative Example 22 | 7 | 4 | 786 | $5.8 \times 10^5$ | 473 | O |
| Comparative Example 23 | 5 | 2 | 688 | $1.2 \times 10^5$ | 406 | O |
| Comparative Example 24 | 5 | 6 | 624 | $9.2 \times 10^6$ | 395 | O |

When looking at the experimental results in Table 5, in the case of Examples 21 and 22, it was confirmed that the surface resistance was significantly lower than that of Comparative Examples, and the synthesis yield and specific surface area also had excellent values.

In particular, when comparing the experimental results of Example 21, Example 22, Comparative Example 21, and Comparative Example 22, respectively, the results of Comparative Example 21 and Comparative Example 22 are significantly lower than those of the Embodiments. This is believed to be due to the fact that when preparing the catalyst structure body for synthesizing the carbon nanotubes of the Comparative Examples, the frequency of the applied plasma is excessively low or high, resulting in the insufficient formation of physical defects in the catalyst structure body by the plasma, resulting in a decrease in the adsorption efficiency of the metal catalyst precursor, or excessive formation of physical defects, resulting in damage to the shape of the central column of the branched carbon nanotube.

In addition, in the case of Comparative Example 21, it was confirmed that the water dispersibility was lower than that of other carbon nanotubes because precipitation occurred during water dispersion.

On the other hand, when referring to the results of Example 21 together with the results of Comparative Examples 23 and 24, it can be seen that the results of Example 21 are significantly superior, which is judged to be due to the problem that the pulse width of the plasma is formed excessively short or long, similar to the reason above.

Therefore, it can be concluded from the present experimental results that the plasma is preferably applied at a frequency of 3 to 6 kHz and a pulse width of 3 to 5 seconds in the production of the catalyst structure body.

EXPERIMENTAL EXAMPLE 6

A catalyst structure body and carbon nanotubes were prepared using the same method as in Preparation Example 2, but a catalyst functional enhancer was further added when preparing the precursor mixture during the production of the catalyst structure body.

At this time, the catalyst functional enhancer was added in the weight shown in Table 2, and in this case, the weight shown in Table 6 is the weight with respect to 100 parts by weight of the catalyst precursor, and the synthesis yield of the carbon nanotubes manufactured according to each Example was calculated using the same method as in Example 5, and the results are shown in Table 6.

TABLE 6

| | Catalyst functional enhancer (parts by weight) | | | |
|---|---|---|---|---|
| | Indole (A) | Disteardimonium hectorite (B) | Weight ratio (B/A) | Synthesis yield (%) |
| Example 21 | — | — | 0 | 1,012 |
| Example 23 | 8.8 | — | 0 | 1,248 |
| Example 24 | — | 9.2 | — | 1,017 |
| Example 25 | 7.4 | 2.0 | 0.27 | 1,289 |
| Example 26 | 6.8 | 2.3 | 0.34 | 1,564 |
| Example 27 | 6.2 | 3.2 | 0.52 | 1,683 |
| Example 28 | 5.6 | 3.7 | 0.66 | 1,660 |
| Example 29 | 5.3 | 3.9 | 0.74 | 1,257 |

When looking at the experimental results of Table 6, it was found that the synthesis yields increased when a catalyst functional enhancer was added during the preparation of the precursor mixture.

When looking at the results of Examples 23 to 29 in Table 6, it was found that the synthesis yield increased more when the indole or hectorite compound was used as a catalyst functional enhancer than when used alone. In the case of Examples 26 to 28, it was confirmed that a particularly significant increase was exhibited.

From these results, it can be seen that the yield of carbon nanotube synthesis is increased when a catalyst functional enhancer is used in the preparation of the precursor mixture. In particular, when indole and hectorite compounds are used in a weight ratio of 1:0.3 to 0.7 as a catalyst functional enhancer, a more significant yield improvement effect can be obtained by increasing the stability of the precursor mixture and improving the function of the catalyst.

INDUSTRIAL APPLICABILITY

The present disclosure relates to a continuous carbon nanotubes synthesizing method using a plasma-treated catalyst, in which metal nanoparticles are prepared by plasma treating a metal salt, and continuous carbon nanotubes manufacturing is performed by reacting the metal salt with a carbon source in the gas phase, without adding a separate reducing agent, so that the carbon nanotubes of the present disclosure can be used industrially.

The invention claimed is:

1. A method of continuously synthesizing carbon nanotubes, the method comprising:

a plasma treating step of producing metal nanoparticles by performing plasma treatment on a metal salt in an $H_2$ or $NH_3$ atmosphere;

a first mixture preparing step of preparing an emulsion mixture by mixing a solvent with a surfactant;

a second mixture preparing step of preparing a second mixture by mixing the emulsion mixture with a carrier gas; and a reacting step of introducing the second mixture and metal nanoparticles into a heated reactor to form carbon nanotubes, wherein in the plasma treating step, the plasma treating is performed in a gaseous atmosphere comprising $H_2$ or $NH_3$ and additionally comprising nitrogen gas and a Group 18 inert gas; and wherein $H_2$ or $NH_3$, nitrogen gas, and a Group 18 inert gas are mixed in a volume ratio of 2:5:0.01 to 1.0, and wherein the method further comprises an oxygen plasma treating step in which plasma treating is performed in an oxygen atmosphere after the plasma treating step and before the reacting step, wherein an oxygen gas is supplied at a flow rate of 50 to 300 standard cubic centimeters per minute (sccm).

2. The method of claim 1, wherein the plasma treating step is performed at a pressure in a range of 0.2 to 2.5 Torr.

3. The method of claim 1, wherein the plasma treating step is performed in a temperature range of 50° C. to 300° C. in a frequency range of 15 to 30 KHz.

4. The method of claim 1, wherein in the first mixture preparing step, the solvent is a carbon-containing solvent or a carbon-free solvent, and wherein when the carbon-free solvent is used in the first mixture preparing step, a carbon source gas is added in the second mixture preparing step.

* * * * *